No. 680,615. Patented Aug. 13, 1901.
F. W. POWERS.
AUTOMATIC MEANS FOR SUPPLYING WATER TO STOCK.
(Application filed Mar. 15, 1901.)
(No Model.) 2 Sheets—Sheet 2.
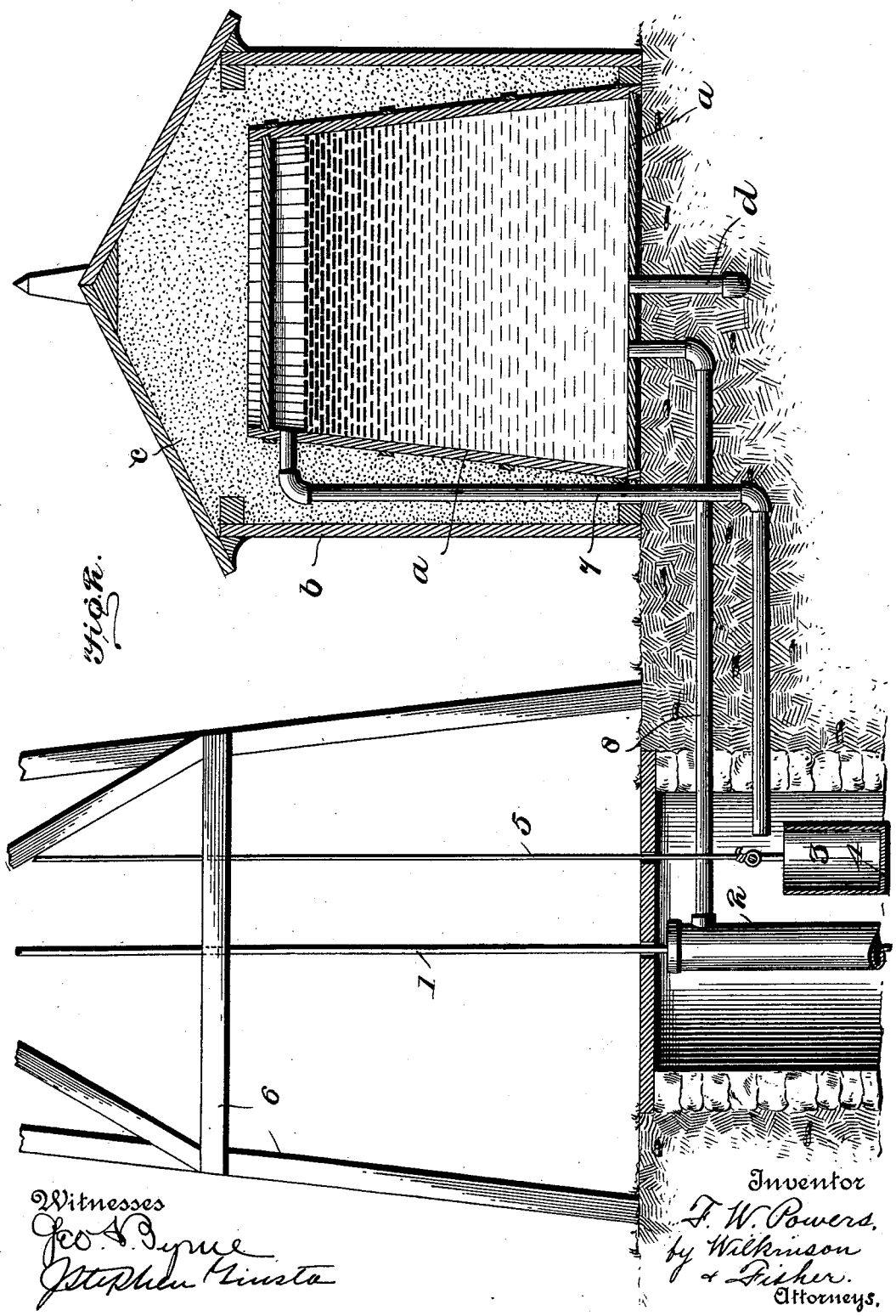
Witnesses
Inventor
F. W. Powers,
by Wilkinson
& Fisher.
Attorneys.

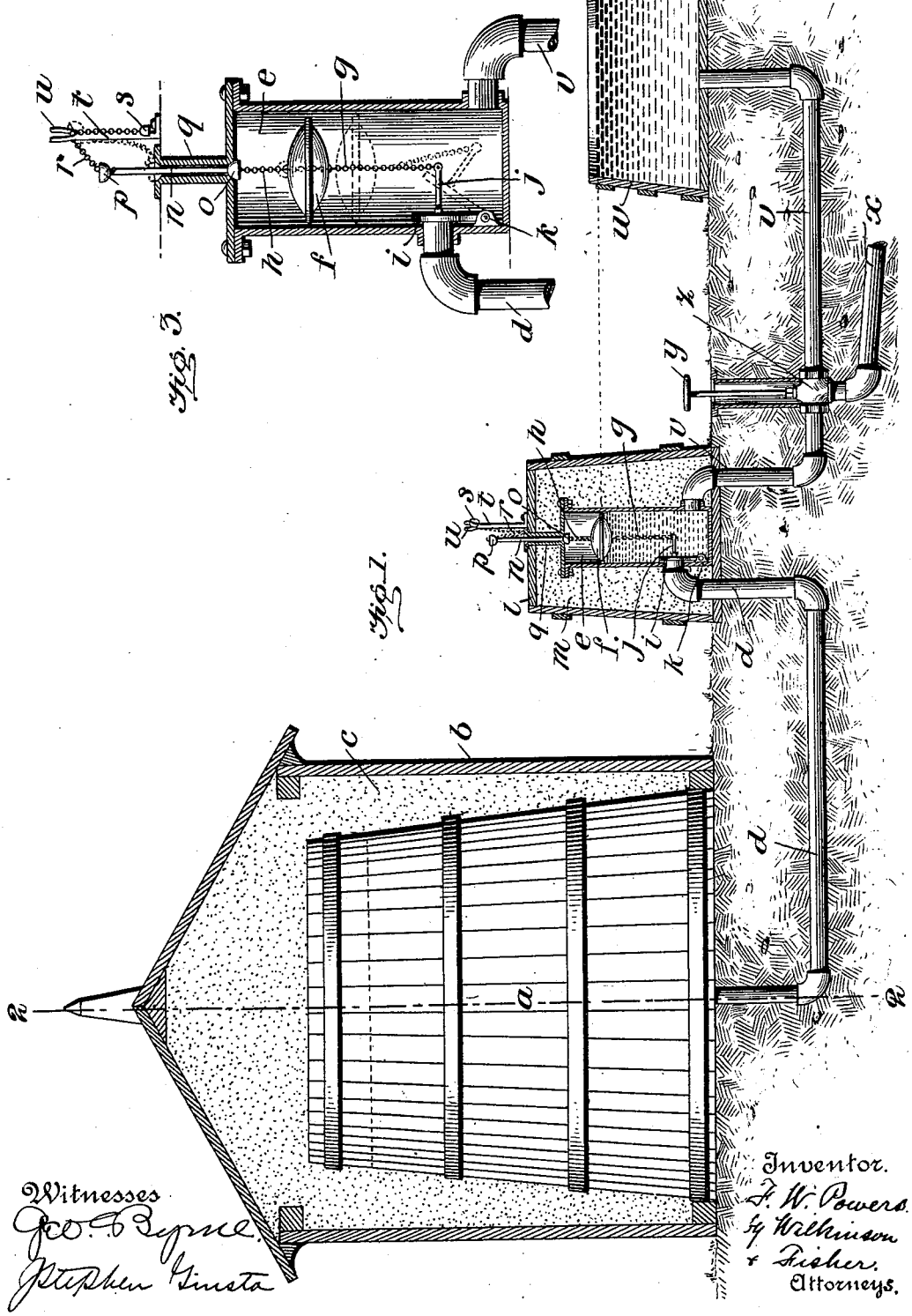

UNITED STATES PATENT OFFICE.

FRANCIS W. POWERS, OF WEST LAFAYETTE, INDIANA.

AUTOMATIC MEANS FOR SUPPLYING WATER TO STOCK.

SPECIFICATION forming part of Letters Patent No. 680,615, dated August 13, 1901.

Application filed March 15, 1901. Serial No. 51,367. (No model.)

*To all whom it may concern:*

Be it known that I, FRANCIS W. POWERS, a citizen of the United States, residing at West Lafayette, in the county of Tippecanoe and State of Indiana, have invented certain new and useful Improvements in Automatic Means for Supplying Water to Stock; and I do hereby declare the following to be a full, clear, and exact description of the invention, such as will enable others skilled in the art to which it appertains to make and use the same.

My invention relates to automatic means for supplying water to stock; and the object of my invention is to automatically provide a constant supply of pure wholesome water for stock at all times without the personal services of an attendant.

In the accompanying drawings, Figure 1 represents a side elevation, partly in section, of my improved device. Fig. 2 represents a central vertical section taken on the line 2 2 of Fig. 1, showing the regulating means for filling the same. Fig. 3 is a central vertical section, parts being shown in elevation, of the regulating means therefor.

$a$ represents a cistern or other reservoir preferably inclosed in a shed $b$, which is adapted to contain a filling $c$, of cork, tanbark, straw, or any other non-conducting material, for the purpose of keeping out the heat in summer and the cold in winter. Of course any other form of water-supply can be used, the water, for instance, being obtained from a pond or from a stream by the use of a dam.

To the cistern $a$ or other source of water-supply is connected a pipe $d$, preferably laid under the ground to keep the water cool in summer and to prevent freezing in winter. This pipe $d$ delivers into a regulating-chamber $e$, which chamber is preferably inclosed by a casing $l$, and a packing $m$, of non-conducting material, is preferably placed between the casing $l$ and the chamber $e$.

A valve $i$ is adapted to close the end of the pipe $d$ at the point where it enters the chamber $e$. This valve is preferably pivoted at $k$, and has a projecting arm $j$, which by means of the chain $g$ is connected to the float $f$. This float $f$ is in turn connected, by means of a chain $h$, with the lower part of a rod $n$, the upper and lower ends of which are provided with hemispherical projections or knobs $o$ and $p$, which fit into correspondingly-shaped depressions in the hollow guide $q$. To the projection $p$ a chain $r$ is attached, having a weight or knob $s$ on the end thereof, which chain is adapted to pass over the hook $u$ in the upper part of the arm $t$, as shown in Fig. 3.

$w$ represents the drinking-tank, and $v$ is the pipe connecting the chamber $e$ and the tank $w$.

$x$ is a waste-pipe, and $z$ represents a valve operated by the handle $y$.

It frequently happens in cold weather that it is desirable to empty the tank $w$ of water at night in order to prevent freezing. This is effected by lifting the float $f$ by means of the chain $r$, having a weight $s$ at its end, which is used as a counterbalance to elevate the float at any desired height, or by fastening the chain around the arm $t$, either by passing one of the links thereof over one of the forks of the hook $u$ or by twisting the chain around the arm $t$. The valve $z$ is then opened, whereupon the water in the tank $w$ and chamber $e$ flows out, thus preventing freezing. A similar result may be obtained by making the valve $z$ a three-way valve—that is to say, when turned in one direction it will allow the water to flow from the chamber $e$ to the tank $w$, shutting off the waste-pipe, and when turned in the other direction it will allow the water to flow down from the tank $w$ through the pipes $u$ and $x$ to waste, but will prevent the water from flowing out from the chamber $e$. The latter method is more economical of water and is usually to be preferred, especially if the chamber $e$ is well protected by a non-conducting packing.

The ordinary operation of my device is obvious. When the parts are as shown in Fig. 1, the tank is nearly full. If the water in the tank $w$ falls by reason of evaporation or because the cattle, stock, or other animals drink it or from any other cause, the water in the chamber $e$ also falls to the same level. This allows the float $f$ to fall, slackening the chain $g$, whereupon the valve $i$ is opened by the pressure of the water in the pipe $d$ and is held open until the flow lifts the float $f$ again, thereby closing the valve.

Means for automatically regulating the supply of water to the cistern or other reservoir $a$ will now be described.

1 represents the pump-rod, working in a pump 2, situated in a well or cistern. 3 is a bucket or other receptacle, provided with the aperture 4 in its bottom. The bucket 3 is suspended in a well by means of a rope, chain, or wire 5, which is connected to the operating mechanism of the rod 1, carried by the windmill 6 or other means that might be employed for operating the rod 1. 7 is an overflow-pipe, one end of which is attached to the top of the cistern $a$ and running down through the non-conducting material $c$, then through the ground, and emptying into the bucket 3. 8 is a supply-pipe connected at one end to the pump 2 and at its other end to the reservoir $a$. The operation of this part of the invention will now be explained. Through the operation of the pump 2 water is pumped from the cistern through the pipe 8 into the reservoir $a$. This operation will continue until the water in the reservoir has reached the height of the overflow-pipe 7 in the top of the reservoir. Water will now flow through the pipe 7 and empty into the bucket 3, filling the same and causing it to lower the rope 5, thereby cutting off the power to the pump-operating mechanism. When the overflow-water has ceased flowing into the bucket 3 through the pipe 7, the aperture 4 will allow the water to drain from the bucket 3 and allow it to rise again. This will again start the pump in operation as before. It will thus be seen that the reservoir is kept filled, and as the water drains therefrom the pump automatically supplies it until again filled.

Having thus described my invention, what I claim as new, and desire to secure by Letters Patent of the United States, is—

1. In means for supplying water to stock, the combination of a chamber, pipes connected thereto, a pivoted valve adapted to close one of said pipes, a float connected to said valve, a rod connected to said float, a weighted chain connected to said rod and a hooked arm for engagement with said chain.

2. In means for supplying water to stock, the combination of a chamber, a covering or casing of non-conducting material surrounding the said chamber, pipes connected thereto, a pivoted valve adapted to close one of the said pipes, a float connected to the said valve, a rod connected to the said float, a weighted chain connected to the said rod and a hooked arm for engagement with the said chain.

3. In means for supplying water to stock, the combination of a reservoir, a covering or casing of non-conducting material surrounding said reservoir, a water-tank, connections between said reservoir and tank, a chamber located in said connections, means located in said chamber for automatically controlling the flow of water from said reservoir to said tank, means for preventing the operation of said automatic means, comprising a weighted chain, engaging said automatic means, and means for causing the contents of said chamber and tank to run to waste when said automatic controlling means is secured against movement.

In testimony whereof I affix my signature in presence of two witnesses.

FRANCIS W. POWERS.

Witnesses:
JACOB H. SMILEY,
SCOTT SHOBE.